US012240264B2

(12) United States Patent
Li

(10) Patent No.: US 12,240,264 B2
(45) Date of Patent: Mar. 4, 2025

(54) FOLDABLE FILE

(71) Applicant: Shengzhou Li, Hunan (CN)

(72) Inventor: Shengzhou Li, Hunan (CN)

( * ) Notice: Subject to any disclaimer, the term of this patent is extended or adjusted under 35 U.S.C. 154(b) by 2 days.

(21) Appl. No.: 18/481,836

(22) Filed: Oct. 5, 2023

(65) Prior Publication Data

US 2025/0042193 A1 Feb. 6, 2025

(30) Foreign Application Priority Data

Aug. 1, 2023 (CN) ......................... 202322055470.5

(51) Int. Cl.
*B42F 9/00* (2006.01)
*B42F 11/02* (2006.01)

(52) U.S. Cl.
CPC .............. *B42F 9/001* (2013.01); *B42F 11/02* (2013.01)

(58) Field of Classification Search
CPC ................................. B42F 9/001; B42F 11/02
USPC ........................................................... D19/88
See application file for complete search history.

(56) References Cited

U.S. PATENT DOCUMENTS

D532,825 S * 11/2006 Bhavnani ....................... D19/88
8,517,330 B1 * 8/2013 Joyce ........................ B43L 5/02 248/452
11,485,164 B1 11/2022 Khaliq
D982,076 S 3/2023 Khaliq
D982,077 S 3/2023 Khaliq
D982,078 S 3/2023 Khaliq
D982,079 S 3/2023 Khaliq
11,685,182 B2 6/2023 Khaliq
2007/0187565 A1 * 8/2007 Liptan ..................... B42F 9/001 248/456
2023/0085864 A1 3/2023 Khaliq
2023/0087799 A1 * 3/2023 Khaliq ...................... B42F 1/02 281/45
2023/0106163 A1 4/2023 Khaliq

FOREIGN PATENT DOCUMENTS

JP 3148952 U * 3/2009
JP 2020006674 A * 1/2020

OTHER PUBLICATIONS

JP-3148952-U English Translation (Year: 2009).*

* cited by examiner

*Primary Examiner* — Kyle R Grabowski
(74) *Attorney, Agent, or Firm* — Nicholas Makridakis

(57) ABSTRACT

The present disclosure provides a foldable file comprising a first panel, a second panel, and a third panel arranged and coupled together in sequence, the first panel and the second panel hinged by a first hinge assembly, and the second and third panel hinged by a second hinge assembly, enabling the foldable file to switch between an unfolded state and a folded state, wherein at least one lower side edge of the third panel includes a convex edge, and the convex edge protrudes outward compared to a corresponding upper side edge of the first panel.

17 Claims, 6 Drawing Sheets

100

FOLDABLE FILE

RELATED APPLICATIONS

This application claims the benefit of priority to Chinese Patent Application Number 202322055470.5 filed on Aug. 1, 2023, in the China National Intellectual Property Administration. The entire contents of the above-identified application are hereby incorporated by reference.

TECHNICAL FIELD

The disclosure relates to a foldable file.

BACKGROUND

In order to meet the needs of doctors and other workers for carrying and writing or drawing with them, foldable file products have emerged on the market, which can hold materials for writing and provide a flat surface for writing or drawing when unfolded, and can be placed in pockets when folded, making it easy to carry. However, various foldable files on the market are placed in a folded state in the pocket. When taken out and unfolded, due to the edges of several panels, it is difficult to peel off the edges of multiple panels that are separated and overlapped together when unfolding the foldable file, which requires more time and results in inconvenience.

SUMMARY OF INVENTION

The present disclosure provides a foldable file that can quickly expand the foldable file into the foldable state.

The present disclosure provides a foldable file, comprising: a first panel, a second panel, and a third panel arranged and coupled together in sequence, the first panel and the second panel hinged by a first hinge assembly, the second and third panel hinged by a second hinge assembly, so as to enable the foldable file to be switched between an unfolded state that the first panel, the second panel and the third panel are arranged as a flat panel and a folded state that the first panel, the second panel and the third panel are stacked up along a thickness direction of the foldable file, wherein the second panel is located at a bottom layer of the stacked-up foldable file, wherein the first panel includes at least one upper side edge from where the first hinge assembly couples to, the third panel includes at least one lower side edge from where the second hinge assembly couples to and corresponding to the upper side edge; and at least one lower side edge of the third panel includes a convex edge, and the convex edge protrudes outward from the corresponding one upper side edge of the first panel.

In some embodiments, the second panel includes at least one middle side edge corresponding to the upper side edge and the lower side edge, at least one middle side edge of the second panel includes a concave edge recessed toward a centerline of the foldable file.

In some embodiments, the highest point of the convex edge is arranged adjacent to the center of the lower side edge of the third panel and corresponds to the lowest point of the concave edge arranged adjacent to a center of the middle side edge of the second panel when the foldable file is in the folded state.

In some embodiments, the first hinge assembly is arranged on the first panel and the second panel, the first hinge assembly comprises two upper hinges arranged on both sides of the foldable file respectively, with each upper hinge including a first outer bracket, a first inner bracket, and a first pin, the first outer bracket is rotatably connected to the first inner bracket via the first pin, the first outer bracket is farther away from a centerline of the foldable file than the first inner bracket, and a structure of the first outer bracket is different from that of the first inner bracket, the first outer bracket of each upper hinge is located on one of the first panel and the second panel, and the first inner bracket is located on the other of the first panel and the second panel.

In some embodiments, a plane area of the first outer bracket is greater than a plane area of the first inner bracket, and the first outer bracket completely covers a first outer edge of the first inner bracket opposite to a first joint side of the first outer bracket when the foldable file is in the folded state.

In some embodiments, the two upper hinges include a first upper hinge and a second upper hinge, the first outer bracket of the first upper hinge and the first outer bracket of the second upper hinge are respectively arranged on different panels, and the first inner bracket of the first upper hinge and the first inner bracket of the second upper hinge are respectively arranged on different panels.

In some embodiments, the second hinge assembly is arranged on the second panel and the third panel, and the second hinge assembly comprises two lower hinges arranged on both sides of the foldable file respectively, each lower hinge includes a second outer bracket, a second inner bracket, and a second pin, the second outer bracket is rotatably connected to the second inner bracket via the second pin, the second outer bracket is farther away from the centerline of the foldable file than the second inner bracket, a structure of the second outer bracket is different from that of the second inner bracket, the second outer bracket of each lower hinge is located on one of the second panel and third panel, and the second inner bracket is located on the other of the second panel and third panel.

In some embodiments, a plane area of the second outer bracket is greater than a plane area of the second inner bracket, and the second outer bracket completely covers a second outer edge of the second inner bracket opposite to a second joint side of the second outer bracket when the foldable file is in the folded state.

In some embodiments, the two lower hinges include a first lower hinge and a second lower hinge, the second outer bracket of the first lower hinge and the second outer bracket of the second lower hinge are respectively arranged on different panels, and the second inner bracket of the first lower hinge and the second inner bracket of the second lower hinge are respectively arranged on different panels.

In some embodiments, the second panel includes a first middle side edge and a second middle side edge arranged opposite to the first middle side edge, and the first outer bracket of the first upper hinge and the second outer bracket of the first lower hinge are respectively arranged at both ends of the first middle side edge of the second panel, the first inner bracket of the second upper hinge and the second inner bracket of the second lower hinge are respectively arranged at both ends of the second middle side edge of the second panel.

The present disclosure further provides a foldable file, comprising: a first panel, a second panel, and a third panel arranged and coupled together in sequence, the first panel and the second panel hinged by a first hinge assembly, and the second and third panel hinged by a second hinge assembly, so as to enable the foldable file to be switched between an unfolded state that the first panel, the second panel and the third panel are arranged as a flat panel and a folded state that the first panel, the second panel and the third panel are stacked up along a thickness direction of the foldable file, wherein, two of the three panels are mostly adjacent to each other, and one of the two panels includes at least one upper side edge from where the first hinge assembly couples to, the other one of the two panels includes at least one lower side edge from where the second hinge assembly couples to and corresponding to the at least one upper side edge; and at least a portion of the at least one upper side edge and the corresponding one lower side edge are misaligned with each other in the thickness direction of the foldable file.

In some embodiments, the other of the three panels includes at least one middle side edge corresponding to the upper side edge and the lower side edge, at least one middle side edge includes a concave edge recessed toward a centerline of the foldable file.

In some embodiments, a highest point of the convex edge is arranged adjacent to a center of the lower side edge and corresponds to a lowest point of the concave edge arranged adjacent to a center of the middle side edge when the foldable file is in the folded state.

In some embodiments, each of the first hinge assembly and the second hinge assembly includes two hinges, each hinge includes an outer bracket, an inner bracket, and a pin, the outer bracket is rotatably connected to the inner bracket via the pin, the outer bracket is farther away from a centerline of the foldable file than the inner bracket, and a plane area of the outer bracket is greater than a plane area of the inner bracket, and the outer bracket completely covers an outer edge of the inner bracket opposite to a joint side of the outer bracket when the foldable file is in the folded state.

In some embodiments, the first hinge assembly is arranged on the first panel and the second panel, the first hinge assembly comprises two upper hinges arranged on both sides of the foldable file respectively, the outer bracket of the first upper hinge and the outer bracket of the second upper hinge are respectively arranged on different panels, and the inner bracket of the first upper hinge and the first inner bracket of the second upper hinge are respectively arranged on different panels.

In some embodiments, the second hinge assembly is arranged on the second panel and the third panel, and the second hinge assembly includes a first lower hinge and a second lower hinge arranged on both sides of the foldable file respectively, the outer bracket of the first lower hinge and the outer bracket of the second lower hinge are respectively arranged on different panels, and the inner bracket of the first lower hinge and the inner bracket of the second lower hinge are respectively arranged on different panels.

In some embodiments, the second panel includes a first middle side edge and a second middle side edge arranged opposite to the first middle side edge, and the outer bracket of the first upper hinge and the outer bracket of the first lower hinge are respectively arranged at both ends of the first middle side edge of the second panel, the inner bracket of the second upper hinge and the inner bracket of the second lower hinge are respectively arranged at both ends of the second middle side edge of the second panel.

The present disclosure provides a foldable file, comprising: a first panel, a second panel arranged and coupled together in sequence, the first panel and the second panel hinged by a hinge assembly, so as to enable the foldable file to be switched between an unfolded state that the first panel and the second panel are arranged as a flat panel and a folded state that the first panel and the second panel are stacked up along a thickness direction of the foldable file, wherein the two panels are mostly adjacent to each other, and one of the two panels includes at least one first side edge from where the hinge assembly couples to, the other one of the two panels includes at least one second side edge from where the hinge assembly couples to and corresponding to the at least one first side edge; and at least a portion of the at least one first side edge and the corresponding one second side edge are misaligned with each other in the thickness direction of the foldable file.

Compared to the conventional foldable files, when opening the foldable file, the structure formed by the convex edge of the first lower side edge or the second lower side edge and the convex edge of the first lower side edge or the second lower side edge may help the users to open the foldable file more easily.

BRIEF DESCRIPTION OF DRAWINGS

The drawings illustrate the embodiments and form a part of the specification, together with a written description of the specification, to explain the exemplary embodiment of the embodiment. It is obvious that the drawings in the following description are only some embodiments of the present disclosure. For ordinary technical personnel in the art, other drawings can be obtained based on these drawings without any creative labor. In all drawings, the same reference numerals refer to similar but not necessarily identical elements.

DETAILED DESCRIPTION

In order to make the purpose, technical solution, and advantages of this utility model clearer, further detailed descriptions will be given below in conjunction with the accompanying drawings. Obviously, the described implementation methods are only a part of the implementation methods of this utility model, not all of them. Based on the implementation methods in this utility model, all other implementation methods obtained by ordinary technical personnel in this field without creative labor fall within the scope of protection of this utility model.

First Embodiment

Figure 1:
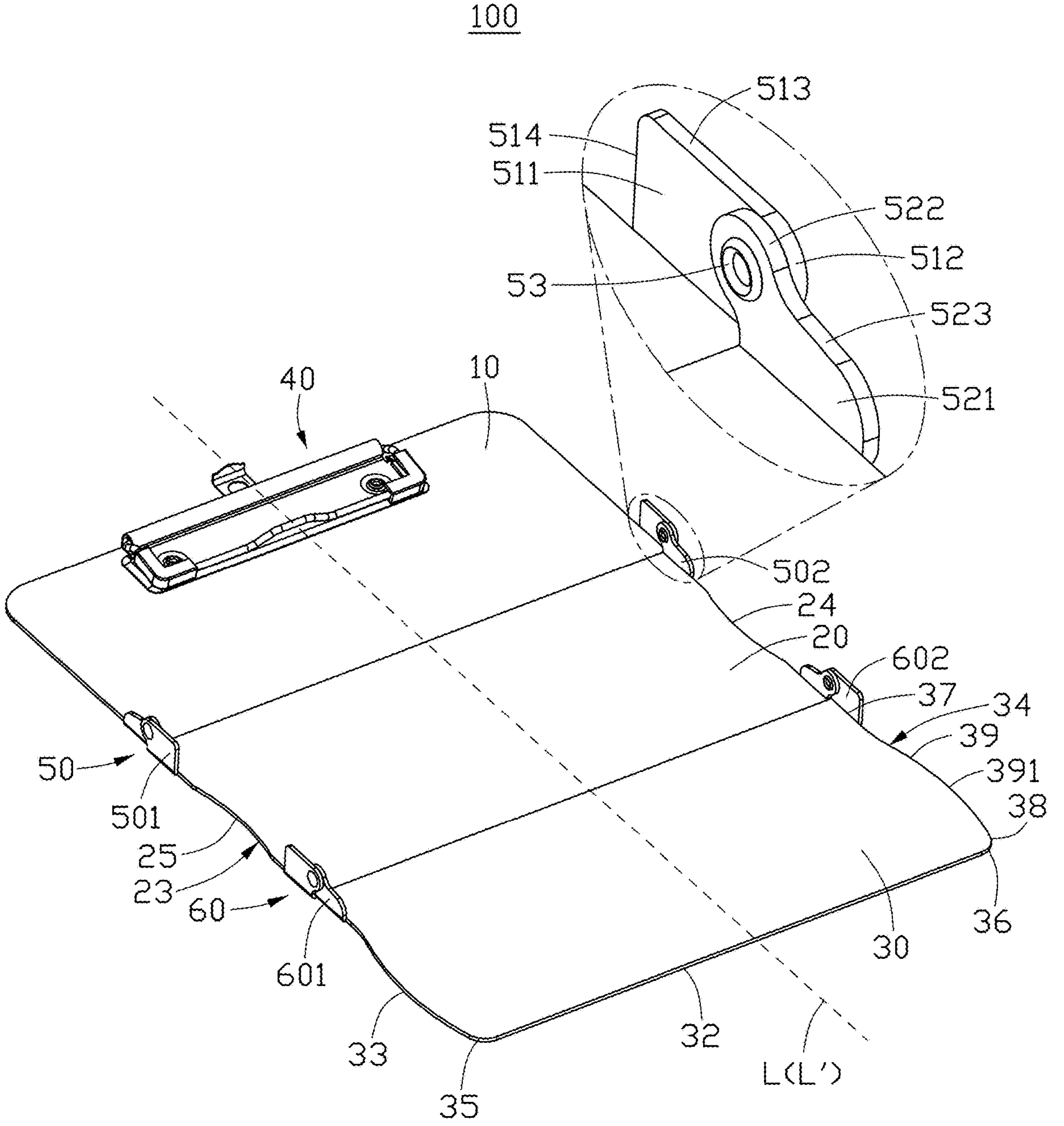
FIG. 1 is a three-dimensional structure diagram of the foldable file in the unfolded state of a first embodiment of the present disclosure.
Figure 2:
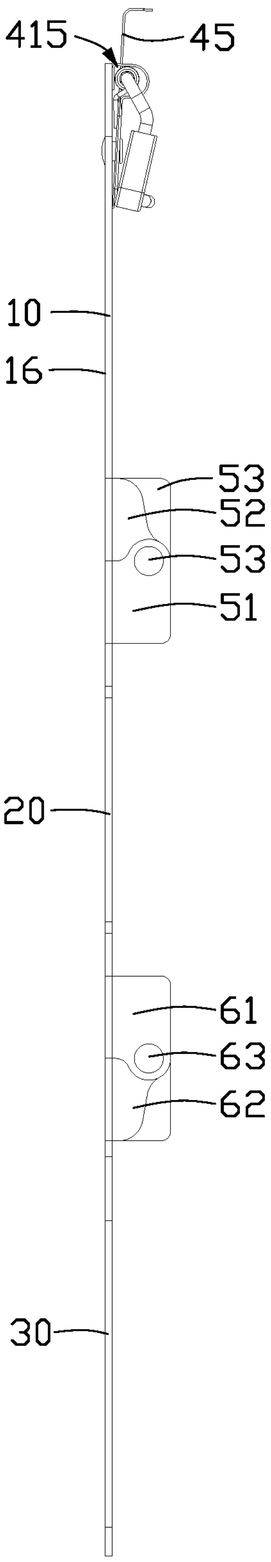
FIG. 2 is a side view of the foldable file shown in FIG. 1.
Figure 3:
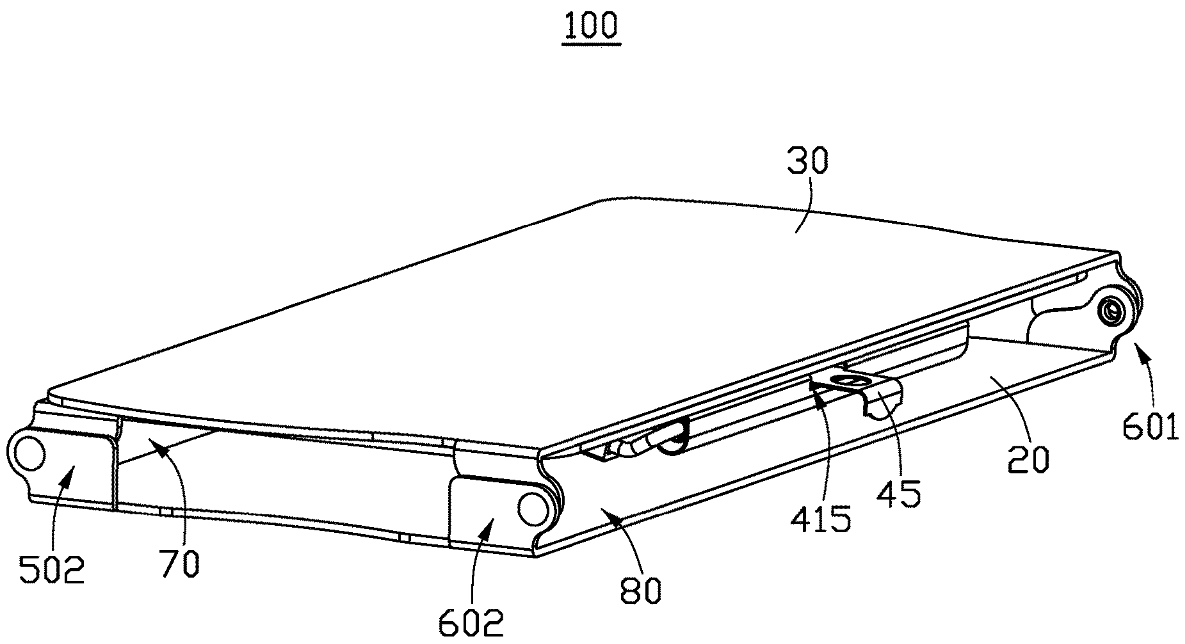
FIG. 3 is a three-dimensional structure diagram of the foldable file shown in FIG. 1 in the unfolded state.

Referring to FIGS. 1 to 4, the first embodiment provides a foldable file 100 capable of switching between an unfolded state (as shown in FIG. 1) and a folded state (as shown in FIG. 3). In the unfolded state, each panel of the foldable file 100 opens and these panels are continuously arranged as a flat plate, and therefore users can write or draw on the foldable file 100 in the unfolded state. In the folded state, some panels of the foldable file 100 are folded and stack each other along a thickness direction of the foldable file

100, and therefore making the foldable file 100 having a small size to be stored in storage bags such as pockets and bags.

The number of the panels of the foldable file in the present disclosure is not less than two, and the foldable file 100 includes a first panel 10, a second panel 20, a third panel 30, which are arranged and coupled together in sequence. The first panel 10 is rotatably connected to the second panel 20 by a first hinge assembly 50, and the second panel 20 is rotatably connected to the third panel 30 by a second hinge assembly 60. A clamp member 40 is arranged on the first panel 10 to clamp writing materials on the foldable file 100. In the present disclosure, the foldable file 100 at least includes a panel having the clamp member 40, and another panel hinged to the panel having the clamp member 40.

The first panel 10 can be for example a rectangular flat panel which is located a most upper area of the flat panel formed by the foldable file 100 in unfolded state, and/or sandwiched between the second panel 20 and third panel 30 when the foldable file 100 is in the folded state. The first panel 10 includes a first upper edge 11 and a first lower edge 12 arranged opposite to the first upper edge 11, a first left side edge 13 and a first right side edge 14 arranged opposite to the first left side edge 13. In this embodiment, the first upper edge 11 and the first lower edge 12 each serve as two long sides of the rectangular flat panel, and the first left side edge 13 and the first right side edge 14 serve as two short sides of the rectangular flat panel. The clamp member 40 is located adjacent to the first upper edge 11.

Figure 5:
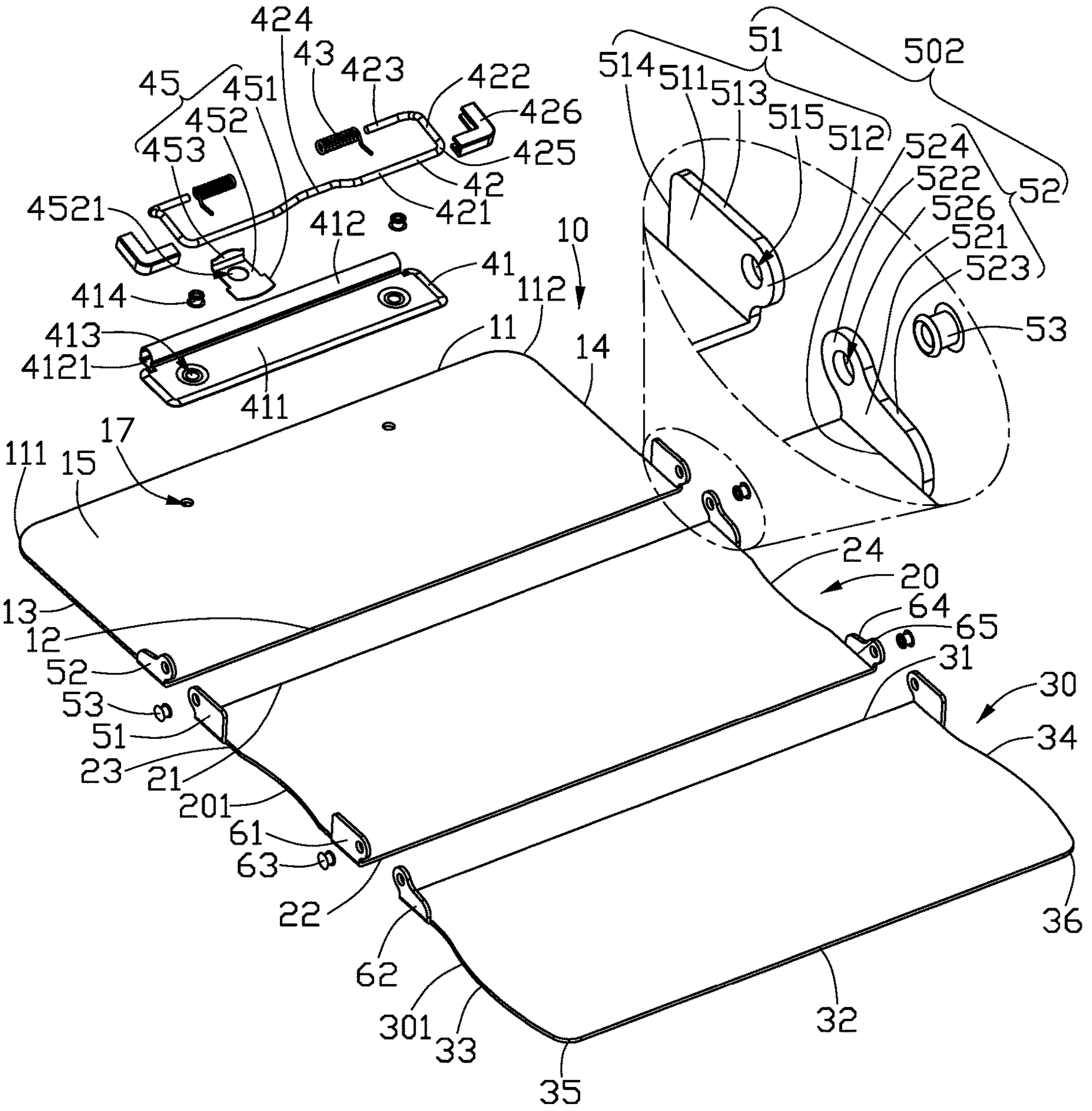
FIG. 5 is an exploded schematic diagram of the foldable file shown in FIG. 1.

Referring to FIG. 5, a first upper corner 111 at an intersection of the first upper edge 11 and the first left side edge 13 and a second upper corner 112 at an intersection of the first upper edge 11 and the first right side edge 14, each of which is a rounded corner.

The first panel 10 further includes an upper surface 15 and a lower surface 16 arranged opposite to each other. The clamp member 40 is fixed on the upper surface 15 of the first panel 10 via two through holes 17 which are adjacent to the first upper edge 11.

The second panel 20 can be for example a roughly rectangular flat panel which is located a central area of the flat panel formed by the foldable file 100 in unfolded state, and/or opposites to the first panel 10 when the foldable file 100 is in the folded state. In detail, the second panel 20 is located below of the first panel 10 with a wide distance D1 when the foldable file 100 is in the folded state, that is the second panel 20 is located at a bottom layer of the stacked-up foldable file. The second panel 20 includes a second upper edge 21 and a second lower edge 22 arranged opposite to the second upper edge 21, a second left side edge 23 and a second right side edge 24 arranged opposite to the second left side edge 23. In this embodiment, the second upper edge 21 and the second lower edge 22 each serve as two long sides of the second panel 20, and the second left side edge 23 and the second right side edge 24 each serve as two short sides of the second panel 20. The second upper edge 21 is more adjacent to the first panel 10 compared to the second lower edge 22.

At least one side edge of the second panel 20 is formed by a concave edge 201 slightly recessed toward a centerline L of the foldable file 100 perpendicular to the long sides of each panel of the foldable file 100 and/or a centerline L' of the second panel 20 which is also the symmetry axis of the second panel 20. In this embodiment, the centerline L' is align with the centerline L. The second upper edge 21 and the second lower edge 22 are both straight linear edges, and the second left side edge 23 and the second right side edge 24 are the concave edges slightly recessed towards the centerline L of the foldable file 100 and/or the centerline L'. The concave edge is shaped as a smile curve or an arc curve, and its lowest point of the curve edge is arranged adjacent to a center of the side edge of the second panel 20.

In other embodiment, the concave edge 201 can be a portion of the second left side edge 23 or a portion of the second right side edge 24 of the second panel 20, that is at least one of the second left side edge 23 and the second right side edge 24 comprises a concave portion 25 recessed toward a centerline of the foldable file 100. That is, the second left side edge 23 and the second right side edge 24 may include the concave edge 201, and therefore it is convenient for users to hold the foldable file 100.

The third panel 30 can also be for example a substantially rectangular flat panel which is located a lowest area of the flat panel formed by the foldable file 100 in unfolded state, and/or is stacked above both the second panel 20 and first panel 10 and is located adjacent to the first panel 10 with a narrow distance D2 compared to the wide distance D1 defined by the first panel 10 and the second panel 20, when the foldable file 100 is in the folded state. The third panel 30 includes a third upper edge 31 and a third lower edge 32 arranged opposite to the third upper edge 31, a third left side edge 33 and a third right side edge 34 arranged opposite to the third left side edge 33. In this embodiment, the third upper edge 31 and the third lower edge 32 each serve as two long sides of the third panel 30, and the third left side edge 33 and the third right side edge 34 each serve as two short sides of the third panel 30. The third upper edge 31 is more adjacent to the first panel 10 compared to the third lower edge 32.

In this embodiment, the first upper edge 13 of the first panel 10, the second left side edge 23 of the second panel 20 and the third left side edge 33 of the third panel 30 are located on the same side of the foldable file 100, the first right side edge 14 of the first panel 10, the second right side edge 24 of the second panel 20 and the third right side edge 34 of the third panel 30 are located on the same other side of the foldable file 100.

At least a part of the third left side edge 33 corresponds to the first left side edge 13 of the first panel 10, or/and at least a part of the third right side edge 34 corresponds to the first right side edge 14 of the first panel 10 when the foldable file 100 is in the folded state.

In this embodiment, at least one side edge of the third panel 30 is formed by a convex edge 301 slightly protruded outward a corresponding one of the first left side edge 13 and the first right side edge 14 of the first panel 10. In some embodiments, at least one of the third left side edge 33 and the third right side edge 34 includes a hinge installation portion 37 to where the second hinge assembly 60 is mounted to a free end portion 38 and a connecting portion 39. The free end portion 38 includes a second lower corner 36 (e.g., a corner) of the third panel 30, and a connecting portion 38 located between the free end portion 38 and the hinge installation portion 37. The connecting portion 39 includes a protrusion portion 391. The protrusion portion 391 protrudes outwardly from the hinge installation portion 37, and from the corresponding side edge of the first panel 30 in the folded state. In this embodiment, the third upper edge 31 and the third lower edge 32 of the third panel 30 are both straight linear edges, and the third left side edge 33 and the third right side edge 34 are convex edges slightly protruded outward the first left side edge 13 and the first right side edge 14 of the first panel 10, respectively. The convex edge 301 is shaped as an arc curve, and the highest point of the convex edge is arranged adjacent to a center of the side edge of the third panel 30 and corresponds to the lowest point of the concave edge 201.

Alternatively, the convex edge 301 can be a portion of the third left side edge 33 or a portion of the third right side edge 34 of the third panel 30. That is, the third left side edge 33 and the third right side edge 34 may include the convex edge 301, and therefore it is convenient for users to open the foldable file 100.

In this embodiment, as shown in FIG. 3, in the folded state, the convex edge 301 of the third left side edge 33 is located above the concave edge 201 of the second left side edge 23, and the convex edge 301 of the third right side edge 34 is located above the concave edge 201 of the second right side edge 24, so as to further increase an area of the convex edge 301 exposed out of the outside. When opening the foldable file 100, the structure formed by the convex edge 301 of the third left side edge 33 or the third right side edge 34 and the convex edge 301 of the third left side edge 33 or the third right side edge 34 may help the users to open the foldable file 100 more easily.

Furthermore, in this embodiment, a first lower corner 35 at an intersection of the third lower edge 32 and the third left side edge 33 and a second lower corner 36 at an intersection of the third lower edge 32 and the third right side edge 34, each of which is a rounded corner.

Referring also FIG. 5, the clamp member 40 includes a fixed member 41, a rotating member 42, and an elastic member 43. The fixed member 41 is fixedly arranged on the first panel 10, and the fixed member 41 includes a flat portion 411 and a receiving portion 412. The flat portion 411 is attached to the first panel 10, and at least one fixing hole 413 is defined on the flat portion 411. The at least one fixing hole 413 is aligned with the corresponding through hole 17 for a fixing column 414 to pass through and fix the fixed member 41 on the first panel 10. Therefore, the fixed member 41 is firmly fixed on the first panel 10 through the corresponding fixing column 414.

The receiving portion 412 is configured to receive a fixed end 423 of the rotating member 42. A receiving cavity 4121 is formed within the receiving portion 412, and an extension direction of the receiving cavity 4121 is parallel to the first upper edge 11 of the first panel 10. The two ends of the receiving chamber 4121 are opened for an insertion of the fixed end 423 of the rotating member 42.

A hole portion 415 is defined on a side near an upper edge of the receiving portion 412 (see FIG. 3), and is configured to receive a hook member 45, which can be movably inserted into the hole portion 415. In this embodiment, the hole portion 415 is a narrow hole.

The hook member 45 includes a supporting portion 451, a hook portion 452, and an extension portion 453, the supporting portion 451 and the extension portion 453 are arranged on both sides of the hook portion 452 respectively.

The supporting portion 451 is received in the receiving portion 412. The supporting portion 451 can be for example coplanar with the hook portion 452, and a width of the supporting portion 451 is not only greater than the a of the hook portion 452, but also be greater than a width of the hole portion 415. Therefore, the supporting portion 451 can support an inner wall of the receiving portion 412 and prevent the hook portion 452 from falling off from the fixed member 41.

A hanging hole 4521 is defined on the hook portion 452, so that when the hook member 45 extends, the foldable file 100 can be hung on any component such as nails on the wall.

The extension portion 453 is arranged outside the receiving portion 412 for the user to push, so that when it is necessary to hang the foldable file 100 on a wall or other position, the extension portion 453 can be slightly pushed to pull out the hook member 45, so that the hook portion 452 is exposed out of the receiving cavity, in this way, a nail on the wall passes through the hanging hole 4521 to hang the foldable file 100 on the wall. In this embodiment, the extension portion 453 is disposed substantially vertically to the hook portion 452, and its height is greater than the width of the hole portion 415 so as to prevent the extension portion 453 from being inserted into the receiving cavity 4121.

The rotating member 42 includes a first rod portion 421, a second rod portion 422 located on either side of the first rod portion 421, and fixed ends 423 connected to two sides of the second rod portion 422.

An extension direction of the first rod part 421 is the same as that of the first upper edge 11 of the first panel 10. The first rod portion 421 includes a pushing portion 424, which protrudes from the first rod portion 421 in a direction away from the first panel 10.

Two pressing portions 425 are formed between one end of the first rod portion 421 and the second rod portion 422, and another end of the first rod portion 421 and the second rod portion 422 respectively, and the pressing portion 425 is configured to press the writing material onto the foldable file 100. Furthermore, the pressing portion 425 is further sheathed with a plastic portion 426 to prevent from damaging the writing material.

The fixed ends 423 are received in the receiving portion 412 of the fixed member 41 and inserted from the openings at both ends of the receiving cavity 4121 respectively. In this embodiment, each of the fixed ends 423 is sleeved with an elastic member 43, which is configured to maintain the pressing portion 425 against the first panel 10 or reset the pressing portion 425 against the first panel 10 without the pushing portion 424 being pushed. The elastic member 43 can be for example a spring.

When pushing the pushing portion 424, the pressing portion 425 detaches from the first panel 10, the writing material can be placed on the foldable file 100. When releasing the pushing portion 424, the pressing portion 425 moves towards the foldable file 100 and fixes the writing material on the foldable file 100.

The first hinge assembly 50 is configured to hinge the first panel 10 and the second panel 20 and arranges on the first panel 10 and the second panel 20. The first hinge assembly 50 includes two upper hinges arranged on both sides of foldable file 100 respectively. Each upper hinge includes a first outer bracket 51, a first inner bracket 52, and a first pin 53, the first outer bracket 51 is rotatably connected to the first inner bracket 52 via the first pin 53. The first outer bracket 51 is farther away from the centerline L of the foldable file 100 than the first inner bracket 52. In this embodiment, the structure of the first outer bracket 51 is different from that of the first inner bracket 52, that is, the first outer bracket 51 of each upper hinge is located on one of the first panel 10 and the second panel 20, and the first inner bracket 52 is located on the other of the first panel 10 and the second panel 20.

In this embodiment, referring to FIGS. 2 to 5, a plane area of the first outer bracket 51 is greater than that of the first inner bracket 52.

Figure 4:
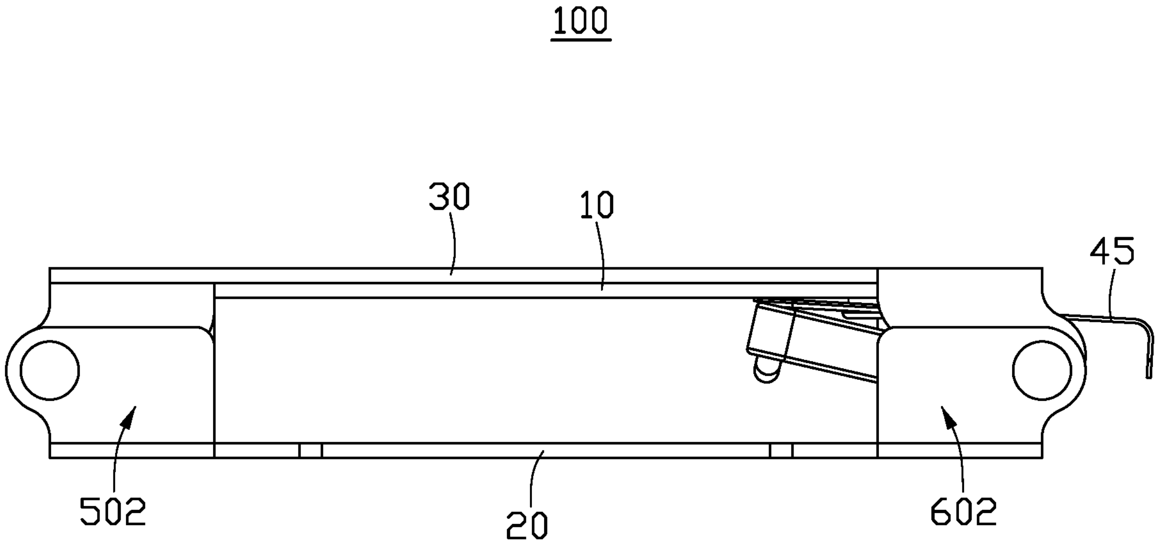
FIG. 4 is a side view of the folded state of the foldable file shown in FIG. 1.

Due to the plane area of the first outer bracket 51 is larger than that of the first inner bracket 52, and the first outer bracket 51 completely covers an first outer edge 521 of the first inner bracket 52 opposite to a first joint side 522 of the first inner bracket 52 extended from the first panel 10, so that there is no gap between the first outer bracket 51 and the first inner bracket 52 when the foldable file 100 is in the folded state, which may prevent the writing material from being pinched out from gaps and being damaged (see FIG. 4).

In this embodiment, the two upper hinges include a first upper hinge 501 and a second upper hinge 502. The first outer bracket 51 of the first upper hinge 501 and the first outer bracket 51 of the second upper hinge 502 are respectively arranged on different panels, and the first inner bracket 52 of the first upper hinge 501 and the first inner bracket 52 of the second upper hinge 502 are respectively arranged on different panels.

Referring to FIGS. 2 and 5, taking the second upper hinge 502 as an example to illustrate in detail. In this embodiment, the first outer bracket 51 of the first upper hinge 501 is connected to the first right side edge 14 of the first panel 10 near the first lower edge 12 thereof, and the first outer bracket 51 is integrally formed with the first panel 10. Alternatively, the first outer bracket 51 may be connected to the first panel 10 by welding, adhering, connecting via connectors, and all other forms of connection known in the art, which is not limited here.

The first outer bracket 51 includes a first support portion 511 and a first pivot portion 512, the first support portion 511 is configured to support the first pivot portion 512. The first support portion 511 is connected to the first right side edge 14 of the first panel 10, and perpendicular to the first right side edge 14. The first support portion 511 includes a first edge 513 and a second edge 514, the first edge 513 is parallel to the first right side edge 14, the second edge 514 is perpendicular to first right side edge 14, so that the first edge 513 and the second edge 514 are roughly perpendicular. In addition, in this embodiment, the first edge 513 and the second edge 514 both are linear edges.

The first pivot portion 512 is arranged on a side of the first support portion 511 near the first lower edge 12 and located at an end far from the first panel 10 to be capable of articulating with the first inner bracket 52. In this embodiment, the first pivot portion 512 is provided with a first pivot hole 515 for the first pin 53 to pass through.

The first inner bracket 52 is connected to the second right side edge 24 of the second panel 20 near the second upper edge 21 thereof. In this embodiment, the first inner bracket 52 is integrally formed with the second panel 20. In other embodiments, the first inner bracket 52 may be connected to the second panel 20 by welding, adhering, connecting via connectors, and all other forms of connection known in the art, which is not limited here.

In this embodiment, the first inner bracket 52 includes a second support portion 521 and a second pivot portion 522. The second support portion 521 is connected to the second right side edge 24 and configured to support the second pivot portion 522. In this embodiment, the second support portion 521 includes the first outer edge 523 and the joint edge 524 overlapped with the second left side edge 23, the first outer edge 523 extends from the second right side edge 24 to the second pivot portion 522, and a maximum distance from the first outer edge 523 to the second right side edge 24 is less than a distance from the first edge 513 of the first support portion 511 to the first right side edge 14.

In addition, referring to FIG. 3, the first support portion 511 covers at least a portion of the second support portion 521 so that there is no gap between the first outer bracket 51 and the first inner bracket 52 when the foldable file 100 is in the folded state.

The second pivot portion 522 is arranged on an end of the second support portion 521 near the second upper edge 21 and away from the second panel 20 to overlap with the first pivot portion 512. Furthermore, the second pivot portion 522 is provided with a second pivot hole 526, which is aligned with the first pivot hole 515 for the first pin 53 to pass through, thereby enabling the first outer bracket 51 and the first inner bracket 52 to be rotatably connected, thereby enabling the first panel 10 to be rotatably connected to the second panel 20.

The second hinge assembly 60 includes two lower hinges located on both sides of the second panel 20 and the third panel 30, each lower hinge comprising a second outer bracket 61, a second inner bracket 62, and a second pin 63, the second outer bracket 61 is rotatably connected to the second inner bracket 62 via the second pin 63. The second outer bracket 61 is farther away from the centerline L of the foldable file 100 than the second inner bracket 62. The second outer bracket 61 of each hinge is located on one of the second panel 20 and the third panel 30, and the second inner bracket 62 is located on the other of the second panel 20 and the third panel 30.

A structure of the second outer bracket 61 is different from that of the second inner bracket 62. In this embodiment, a plane area of the second outer bracket 61 is greater than a plane area of the second inner bracket 62, and the second outer bracket 61 completely covers a second outer edge 64 of the second inner bracket 62 opposite to a second joint side 65 of the second outer bracket 61 when the foldable file 100 is in the folded state, so that there is no gap between the second outer bracket 611 and the second inner bracket 62 when the foldable file 100 is in the folded state, which may prevent the writing material from being pinched out from gaps and being damaged (see FIG. 4).

Due to the plane area of the second outer bracket 61 is larger than the plane area of the second inner bracket 62, the second outer bracket 61 covers at least a portion of the second inner bracket 62 so that there will be no gap between the second outer bracket 61 and the second inner bracket 62 when the foldable file 100 is in the folded state, which can prevent the writing material from being pinched out from gaps and damaged.

The two lower hinges include a first lower hinge 601 and a second lower hinge 602. The second outer bracket 61 of the first lower hinge 601 and the second outer bracket 61 of the second lower hinge 602 are respectively arranged on different panels. The second inner bracket 62 of the first lower hinge 601 and the second inner bracket 62 of the second lower hinge 602 are respectively arranged on different panels.

In this embodiment, the first outer bracket 51 of the first upper hinge 501 and the second outer bracket 61 of the first lower hinge 601 are respectively arranged at both ends of the second left side edge 23 of the second panel 20. The first inner bracket 52 of the second upper hinge 502 and the second inner bracket 62 of the second lower hinge 602 are respectively arranged at both ends of the second right side edge 24 of the second panel 20.

The structure of the second outer bracket 61, second inner bracket 62, and second pin 63 of the second hinge assembly 60 is the same as that of the first outer bracket 51, first inner bracket 52, and first pin 53 of the first hinge assembly 50 respectively and will not be repeated here.

When the foldable file 100 is in the unfolded state, the first panel 10, the second panel 20, and the third panel 30 are arranged and coupled together in sequence, and the second upper edge 21 and the second lower edge 22 of the second panel 20 are adjacent to the first lower edge 12 of the first panel 10 and the third upper edge 31 of the third panel 30 respectively, so that the first panel 10, the second panel 20, and the third panel 30 are coplanar to provide a flat surface for writing or drawing.

When the foldable file 100 is in the folded state, two of the three panels are mostly adjacent to each other, and one of the two panels includes at least one side edge from where the first hinge assembly couples to, the other one of the two panels includes at least one side edge from where the second hinge assembly couples to and corresponding to the at least one side edge; and at least a portion of the at least one side edge and the corresponding one side edge are misaligned with each other in the thickness direction of the foldable file.

Referring to FIGS. 3 and 4, in this embodiment, when the foldable file 100 is in the folded state, a first space 70 forms between the second panel 20 and the first panel 10, and a second space 80 forms between the third panel 30 and the second panel 20, the first space 70 is opposite to the second space 80, the first panel 10 and the third panel 30 are mostly adjacent to each other, the first left and the first right side edge 13, 14 and the third left and the third right side edge 33,34 are misaligned with each other in the thickness direction of the foldable file 100. The first and second space 70, 80, respectively, and the hinges 501, 502, 601, 602, permit the spacing of both the overlapped third panel 30 and the overlapped first panel 10, such that the third panel 30 may have about a 0 degrees angle relative to the second panel 20 when in the folded state and therefore is substantially parallel thereto, and the first panel 10 may have about a 0 degree angle relative to the third panel 30, and similarly will be about or substantially parallel thereto. However, it will be understood that this desired about 0 degree angle may vary somewhat when a large amount of writing material is held on the foldable file 100. Therefore, as used herein, “about a 0 degree” angle or “substantially a 0 degree” angle, or “substantially parallel” or “about parallel”, means within a range of between 0 degrees and 5 degrees of an angle or alignment, such as a “parallel” alignment.

Compared to the conventional foldable files, when opening the foldable file 100, the structure formed by the convex edge 301 of the third left side edge 33 or the third right side edge 34 and the convex edge 301 of the third left side edge 33 or the third right side edge 34 may help the users to open the foldable file 100 more easily.

Second Embodiment

Based on FIG. 6, the second embodiment of the present disclosure is explained below. In addition, for the convenience of explanation, the components with the same functions as those described in the above embodiments are labeled with the same reference numerals, and their explanations are omitted.

Figure 6:
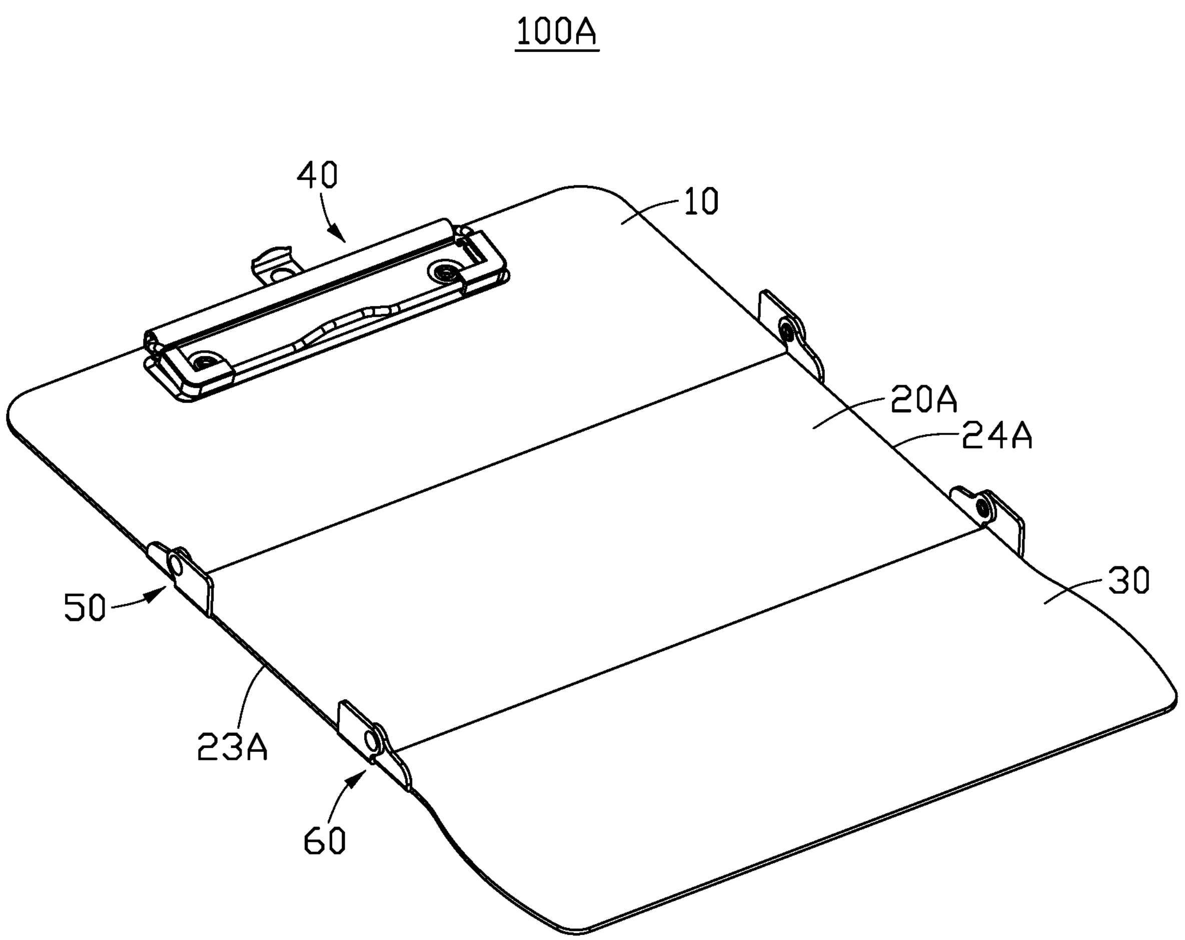
FIG. 6 is a three-dimensional structure diagram of the foldable file in the unfolded state of the second embodiment of the present disclosure.

Referring to FIG. 6, the difference between the foldable file 100A of this embodiment and the foldable file 100 of the first embodiment is that the structure of the second panel 20A is different, and the other components are the same as those in the first embodiment and will not be repeated here.

In this embodiment, the second left side edge 23A and the second right side edge 24A of the second panel 20A are both linear edges without a concave edge.

Based on the above structure, this embodiment can achieve the same effect as the first embodiment.

In addition, ordinary technical personnel in this field should recognize that the above embodiments are only configured to illustrate the present application and not as a limitation of the present application. As long as they are within the substantive scope of the present application, any appropriate changes and changes made to the above embodiments fall within the scope of the disclosure of the present application.

What is claimed is:

1. A foldable file, comprising:

a first panel, a second panel, and a third panel arranged and coupled together in sequence, the first panel and the second panel hinged by a first hinge assembly, the second panel and the third panel hinged by a second hinge assembly, so as to enable the foldable file to be switched between an unfolded state that the first panel, the second panel and the third panel are arranged as a flat panel and a folded state that the first panel, the second panel and the third panel are stacked up along a thickness direction of the foldable file, wherein the second panel is located at a bottom layer of the stacked-up foldable file, wherein the first panel comprises a first left side edge and a first right side edge arranged opposite to the first left side edge, the first left side edge and the first right side edge couple to the first hinge assembly, the third panel comprises a third left side edge and a third right side edge arranged opposite to the third left side edge, the third left edge and the first left edge are both on the same side of the foldable file, the third left side edge and the third right side edge couple to the second hinge assembly; and wherein at least one of the third left side edge and the third right side edge comprises a hinge installation portion to where the second hinge assembly is mounted, a free end portion comprising a corner of the third panel, and a connecting portion located between the free end portion and the hinge installation portion, the connecting portion comprises a protrusion portion, and the protrusion portion protrudes outwardly from the hinge installation portion, and from the corresponding side edge of the first panel in the folded state, wherein the first hinge assembly is arranged on the first panel and the second panel, the first hinge assembly comprises two upper hinges arranged on both sides of the foldable file respectively, each upper hinge includes a first outer bracket, a first inner bracket, and a first pin, the first outer bracket is rotatably connected to the first inner bracket via the first pin, the first outer bracket is farther away from a centerline of the foldable file than the first inner bracket, and a structure of the first outer bracket is different from that of the first inner bracket, the first outer bracket of each upper hinge is located on one of the first panel and the second panel, and the first inner bracket is located on the other of the first panel and the second panel.

2. The foldable file according to claim 1, wherein the second panel comprises a second left side edge and a second right side edge arranged opposite to the second left side edge, the second left side edge and the first left side edge are both on the same side of the foldable file, the second right side edge and the first right side edge are both on the same side of the foldable file, at least one of the second left side edge and the second right side edge comprises a concave portion recessed toward a centerline of the foldable file.

3. The foldable file according to claim 2, wherein the concave portion of the second panel corresponds to the protrusion portion of the connecting portion of the third panel.

4. The foldable file according to claim 3, wherein the first panel is sandwiched between the second panel and the third panel.

5. The foldable file according to claim 1, wherein a plane area of the first outer bracket is greater than a plane area of the first inner bracket, and the first outer bracket completely covers a first outer edge of the first inner bracket opposite to a first joint side of the first outer bracket when the foldable file is in the folded state.

6. The foldable file according to claim 1, wherein the two upper hinges include a first upper hinge and a second upper hinge, the first outer bracket of the first upper hinge and the first outer bracket of the second upper hinge are respectively arranged on different panels, and the first inner bracket of the first upper hinge and the first inner bracket of the second upper hinge are respectively arranged on different panels.

7. The foldable file according to claim 6, wherein the second hinge assembly is arranged on the second panel and the third panel, and the second hinge assembly comprises two lower hinges arranged on both sides of the foldable file respectively, each lower hinge includes a second outer bracket, a second inner bracket, and a second pin, the second outer bracket is rotatably connected to the second inner bracket via the second pin, the second outer bracket is farther away from the centerline of the foldable file than the second inner bracket, a structure of the second outer bracket is different from that of the second inner bracket, the second outer bracket of each lower hinge is located on one of the second panel and third panel, and the second inner bracket is located on the other of the second panel and third panel.

8. The foldable file according to claim 7, wherein a plane area of the second outer bracket is greater than a plane area of the second inner bracket, and the second outer bracket completely covers a second outer edge of the second inner bracket opposite to a second joint side of the second outer bracket when the foldable file is in the folded state.

9. The foldable file according to claim 6, wherein the two lower hinges include a first lower hinge and a second lower hinge, the second outer bracket of the first lower hinge and the second outer bracket of the second lower hinge are respectively arranged on different panels, and the second inner bracket of the first lower hinge and the second inner bracket of the second lower hinge are respectively arranged on different panels.

10. The foldable file according to claim 9, wherein the second panel comprises a second left side edge and a second right side edge arranged opposite to the second left side edge, and the first outer bracket of the first upper hinge and the second outer bracket of the first lower hinge are respectively arranged at both ends of the second left side edge of the second panel, the first inner bracket of the second upper hinge and the second inner bracket of the second lower hinge are respectively arranged at both ends of the second right side edge of the second panel.

11. A foldable file, comprising:

a first panel, a second panel, and a third panel arranged and coupled together in sequence, the first panel and the second panel hinged by a first hinge assembly, and the second and third panel hinged by a second hinge assembly, so as to enable the foldable file to be switched between an unfolded state that the first panel, the second panel and the third panel are arranged as a flat panel and a folded state that the first panel, the second panel and the third panel are stacked up along a thickness direction of the foldable file, wherein the first panel comprises a first side edge coupled to the first hinge assembly, the third panel comprises a third side edge coupled to the second hinge assembly, the third side edge and the first side edge are both on the same side of the foldable file, in the folded state, at least a portion of the first side edge and the third side edge are misaligned with each other in the thickness direction of the foldable file to form a protrusion portion protruding outward beyond the first side edge at the third side edge, such that the user's finger contacts the protruding portion without contacting the first panel when opening the folding panel, wherein each of the first hinge assembly and the second hinge assembly includes two hinges, each hinge includes an outer bracket, an inner bracket, and a pin, the outer bracket is rotatably connected to the inner bracket via the pin, the outer bracket is farther away from a centerline of the foldable file than the inner bracket, and a plane area of the outer bracket is greater than a plane area of the inner bracket, and the outer bracket completely covers an outer edge of the inner bracket opposite to a joint side of the outer bracket when the foldable file is in the folded state.

12. The foldable file according to claim 11, wherein the second panel comprises a second side edge corresponding to the first side edge and the third side edge, the second side edge comprises a concave portion recessed toward a centerline of the foldable file.

13. The foldable file according to claim 12, wherein the concave portion of the second panel corresponds to the protrusion portion of the third panel.

14. The foldable file according to claim 13, wherein a highest point of the protrusion portion is arranged adjacent to a center of the third side edge and corresponds to a lowest point of the concave portion arranged adjacent to a center of the second side edge when the foldable file is in the folded state.

15. The foldable file according to claim 11, wherein the first hinge assembly is arranged on the first panel and the second panel, the first hinge assembly comprises two upper hinges arranged on both sides of the foldable file respectively, the outer bracket of the first upper hinge and the outer bracket of the second upper hinge are respectively arranged on different panels, and the inner bracket of the first upper hinge and the first inner bracket of the second upper hinge are respectively arranged on different panels.

16. The foldable file according to claim 15, wherein the second hinge assembly is arranged on the second panel and the third panel, and the second hinge assembly includes a first lower hinge and a second lower hinge arranged on both sides of the foldable file respectively, the outer bracket of the first lower hinge and the outer bracket of the second lower hinge are respectively arranged on different panels, and the inner bracket of the first lower hinge and the inner bracket of the second lower hinge are respectively arranged on different panels.

17. The foldable file according to claim 16, wherein the second panel comprises a second left side edge and a second right side edge arranged opposite to the second left side edge, and the outer bracket of the first upper hinge and the outer bracket of the first lower hinge are respectively arranged at both ends of the second left side edge of the second panel, the inner bracket of the second upper hinge and the inner bracket of the second lower hinge are respectively arranged at both ends of the second right side edge of the second panel.

* * * * *